United States Patent
Nielsen et al.

(10) Patent No.: US 12,066,003 B2
(45) Date of Patent: Aug. 20, 2024

(54) PITCH CONTROLLED WIND TURBINE WITH BLADE CONNECTING MEMBERS

(71) Applicant: VESTAS WIND SYSTEMS A/S, Aarhus N (DK)

(72) Inventors: Thomas S. Bjertrup Nielsen, Randers SV (DK); Torben Juul Larsen, Roskilde (DK); Mikkel Kiilerich Østerlund, Aarhus C (DK); Mohammed Fajar, Hinnerup (DK); Peter Bøttcher, Egå (DK); Robert Rudolf, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/257,576

(22) PCT Filed: Dec. 17, 2021

(86) PCT No.: PCT/DK2021/050374
§ 371 (c)(1),
(2) Date: Jun. 14, 2023

(87) PCT Pub. No.: WO2022/128040
PCT Pub. Date: Jun. 23, 2022

(65) Prior Publication Data
US 2024/0035440 A1 Feb. 1, 2024

(30) Foreign Application Priority Data
Dec. 17, 2020 (DK) .............. PA 2020 70843

(51) Int. Cl.
F03D 1/06 (2006.01)

(52) U.S. Cl.
CPC .......... F03D 1/066 (2023.08); F03D 1/0664 (2023.08); F03D 1/0677 (2023.08); F05B 2240/302 (2013.01)

(58) Field of Classification Search
CPC ...... F03D 1/0664; F03D 1/0677; F03D 1/066; F03D 1/0658; F03D 7/02; F05B 2240/032; F05B 2260/30
See application file for complete search history.

(56) References Cited

U.S. PATENT DOCUMENTS 5,584,661 A * 12/1996 Brooks ............... B64C 27/467
  416/238
8,629,570 B1 * 1/2014 Kamenov ............... F03D 9/25
  290/55

(Continued)

FOREIGN PATENT DOCUMENTS

| EP | 2112372 A1 | 10/2009 |
| WO | 2013004156 A1 | 1/2013 |
| WO | 2020252273 A1 | 12/2020 |

OTHER PUBLICATIONS

Danish Patent and Trademark Office, 1st Technical Examination including The Search Report for Application PA 2020 70843 dated Jun. 16, 2021.

(Continued)

*Primary Examiner* — J. Todd Newton
*Assistant Examiner* — Cameron A Corday
(74) *Attorney, Agent, or Firm* — Patterson + Sheridan, LLP

(57) ABSTRACT

A pitch controlled wind turbine comprising a tower, a nacelle mounted on the tower, a hub mounted rotatably on the nacelle, and at least three wind turbine blades is disclosed. Each wind turbine blade extends between a root end connected to the hub via a pitch mechanism, and a tip end. The wind turbine further comprises at least three blade (Continued)

connecting members, each blade connecting member extending between a connection point on one wind turbine blade and a connection point on a neighboring wind turbine blade, the connection points being arranged at a distance from the root end and at a distance from the tip end of the wind turbine blade. The wind turbine further comprises at least three pre-tension members, each pre-tension member being connected to one of the blade connecting members and to a hub part, the pre-tension members thereby providing pre-tension in the blade connecting members.

20 Claims, 15 Drawing Sheets

(56) References Cited

U.S. PATENT DOCUMENTS

| | | | | |
|---|---|---|---|---|
| 9,017,034 | B2* | 4/2015 | Fuglsang | F03D 1/0658 416/11 |
| 2007/0253818 | A1 | 11/2007 | Stommel | |
| 2009/0208337 | A1* | 8/2009 | Chambers | F03D 1/0658 416/210 R |
| 2011/0309625 | A1* | 12/2011 | Dehlsen | F03D 1/0658 290/55 |
| 2012/0051914 | A1* | 3/2012 | Dehlsen | F03D 7/0228 416/147 |
| 2012/0280509 | A1* | 11/2012 | Fukami | F03D 1/0641 416/223 R |
| 2015/0233343 | A1* | 8/2015 | Versavel | F03D 1/0625 416/147 |
| 2018/0320655 | A1 | 11/2018 | Zhou | |
| 2019/0024628 | A1* | 1/2019 | De Barros | F03D 1/0633 |
| 2019/0320655 | A1* | 10/2019 | Swale | A01N 47/36 |

OTHER PUBLICATIONS

PCT, International Search Report and Written Opinion of The International Searching Authority for Application PCT/DK2021/050374 dated Mar. 25, 2022.

* cited by examiner

PITCH CONTROLLED WIND TURBINE WITH BLADE CONNECTING MEMBERS

FIELD OF THE INVENTION

The present invention relates to a pitch controlled wind turbine comprising a tower, a nacelle mounted on the tower, a hub mounted rotatably on the nacelle, and at least three wind turbine blades connected to the hub via pitch mechanisms.

BACKGROUND OF THE INVENTION

During operation of a wind turbine, the components of the wind turbine are subjected to various loads. For instance, the wind turbine blades of the wind turbine are subjected to loads originating from gravity acting on the wind turbine blades, loads originating from wind pressure on the wind turbine blades, loads originating from changes in wind direction or wind speed, turbulence, etc. Gravity acting on the wind turbine blades primarily results in edgewise loads on the wind turbine blades, and the wind acting on the wind turbine blades primarily results in flapwise loads on the wind turbine blades.

As the size of wind turbines increases, the loads on the wind turbine also increase. In order to handle such increased loads, the amount of material used for manufacturing the wind turbine may be increased. However, this increases the weight as well as the manufacturing costs of the wind turbine.

DESCRIPTION OF THE INVENTION

It is an object of embodiments of the invention to provide a pitch controlled wind turbine in which edgewise and/or flapwise loads on the wind turbine blades are reduced as compared to prior art wind turbines of same length.

The invention provides a pitch controlled wind turbine comprising a tower, a nacelle mounted on the tower, a hub mounted rotatably on the nacelle, and at least three wind turbine blades, wherein each wind turbine blade extends between a root end connected to the hub via a pitch mechanism, and a tip end, the wind turbine further comprising at least three blade connecting members, each blade connecting member extending between a connection point on one wind turbine blade and a connection point on a neighbouring wind turbine blade, where the connection point on a given wind turbine blade is arranged at a distance from the root end and at a distance from the tip end of the wind turbine blade,
  wherein the wind turbine further comprises at least three pre-tension members, each pre-tension member being connected to one of the blade connecting members and to a hub part, each pre-tension member thereby providing pre-tension in the blade connecting member to which it is connected.

Thus, the invention provides a pitch controlled wind turbine, i.e. a wind turbine comprising wind turbine blades which are able to rotate about a substantially longitudinal pitch axis, in order to adjust an angle of attack between the wind turbine blades and the incoming wind, during operation of the wind turbine. The wind turbine comprises a tower and a nacelle mounted on the tower. The wind turbine further comprises a hub mounted rotatably on the nacelle and at least three wind turbine blades. Each wind turbine blade extends between a root end which is connected to the hub via a pitch mechanism, and a tip end. Thus, the wind turbine blades rotate along with the hub, relative to the nacelle, and the tip ends of the wind turbine blades point away from the hub. Since the wind turbine blades are connected to the hub via pitch mechanisms, each wind turbine blade is able to rotate relative to the hub, i.e. to perform pitching movements. The hub and the wind turbine blades form a rotor of the wind turbine. The wind turbine type is hence a horizontal axis wind turbine (HAWT) and having the main axis typically within 10° from horizontal. The blade root being connected to the hub via a pitch mechanism implies that the blade root is connected to a hub with a pitch mechanism, so the blade is pitchable on a longitudinal pitch axis.

The nacelle is normally mounted on the tower via a yaw system allowing the nacelle to rotate relative to the tower in order to appropriately orient the rotor in accordance with the direction of the wind.

The wind turbine further comprises at least three blade connecting members. Each blade connecting member extends between a connection point on one wind turbine blade and a connection point on a neighbouring wind turbine blade. Accordingly, each connecting member interconnects two neighbouring wind turbine blades. The connection point on a given wind turbine blade is arranged at a distance from the root end of the blade, such as at least 10% of the length of the wind turbine blades from the root end to the tip end, and at a distance from the tip end of the wind turbine blade, such as at least 10% of the length of the wind turbine blades from the root end to the tip end. Thus, the connection point is neither arranged at the root end, nor at the tip end, but rather at a position between these two extremes, and with a non-zero distance to each end, such as at least 10% of the length of the wind turbine blades from the root end to the tip end to each end.

The wind turbine further comprises at least three pre-tension members. Each pre-tension member is connected to one of the blade connecting members and to a hub part. Accordingly, the pre-tension members pull the blade connecting members towards the hub, and thereby the pre-tension members provide tension to the blade connecting members, so the blades connected by the blade connecting member are tensioned towards each other.

In the present context the term 'member' in connecting member and pre-tension member should be interpreted broadly to cover any suitable kind of tension member, such as braided or laid ropes of metal wires (such as for example steel wires), polymer fibres (such as for example polyethylene, polypropylene, nylon, polyester, aramid, inorganic fibres (such as for example carbon fibres) or hybrid ropes of such materials, composite pultrusion, metal rods, etc.

The blade connecting members may have a stiffness which differs from a stiffness of the pre-tension members, or the stiffness of the blade connecting members and the pre-tension members may be identical.

In the present context the term 'hub part' should be interpreted to mean the hub, or a part or an element which is connected to the hub in the sense that it rotates along with the hub relative to the nacelle. Such a part or element may be connected to an outer surface of the hub, protrude from the hub, be positioned inside the hub, or be positioned in any other suitable way, as long as it rotates along with the hub.

The pre-tension members may, e.g., be connected to the blade connecting members at a position which is distanced from each of the connection points on the wind turbine blades, e.g. with substantially equal distance to the connection points, i.e. approximately halfway between the wind turbine blades along the blade connecting member.

The pre-tensioned blade connecting members cause the wind turbine blades to mutually support each other, in the sense that loads on the wind turbine blades, in particular edgewise loads and flapwise loads, are 'shared' among the wind turbine blades, via the pre-tensioned blade connecting members. Thereby the loads on the wind turbine blades during operation of the wind turbine may be handled with reduced material thickness. Furthermore—or alternatively—this may be achieved with same or reduced weight and/or with same or reduced manufacturing costs as compared to prior art blades of same length.

Since the pre-tension in the blade connecting members is provided by means of pre-tension members interconnecting the blade connecting members and a hub part it is possible to control pre-tension in the pre-tension members, as well as in the blade connecting members, from the hub, thereby providing easy access for service or adjustment of the pre-tension. Furthermore, it is possible to adjust how much the mean flapwise load is affected for a given pre-tension force. For instance, a short pre-tension member will lead to a higher shift in the mean flapwise bending moment, whereas a long pre-tension member will lead to a higher reduction in the edgewise bending moment amplitude. Finally, by using pre-tension members, the risk of slack in the blade connection members is reduced, since the pre-tension system can be softer than the blade connecting members or the tension and/or length of the pre-tension members may be actively adjustable.

The pre-tension members may be arranged to provide an adjustable pre-tension in the blade connecting members. The tension in the blade connecting member may be determined based on tension in the pre-tension member and angles between the pretension member and the blade connecting member.

According to this embodiment, the pre-tension in the blade connecting members can be adjusted by appropriately adjusting the pre-tension members or an adjustable pre-tension mechanism connected to the pre-tension members. The pre-tension may, e.g., be adjusted during installation in order to obtain a desired pre-tension accurately and/or in order to appropriately balance the pre-tension in the respective blade connecting members relative to each other.

Alternatively or additionally, the pre-tension may be adjusted continuously or repeatedly during operation of the wind turbine. This could, e.g., be relevant in order to ensure that the pre-tension is appropriate under the prevailing operating conditions, e.g. with respect to ambient conditions like wind speed, wind shear, turbulence conditions, temperature, humidity, etc and/or wind turbine conditions like azimuth angle of the blades, pitch angle of the blade and tip speed/rotation (angular) speed.

By designing the pre-tension members to provide an adjustable pre-tension to the blade connecting members, it is possible to obtain a desired pre-tension accurately in an easy manner, and possibly even to adapt the pre-tension to prevailing operating conditions.

On way of adjusting the pre-tension may for example be to wind or unwinding the pre-tension member on a rotatable member, thereby adjusting the length of the pre-tension member, extending/retracting a linear actuator, such as a hydraulic actuator, forming part of or acting on the pre-tension member.

The connection points may be arranged outside an outer surface of the wind turbine blades.

According to this embodiment, the blade connecting members are connected to the respective wind turbine blades at positions which are arranged outside an outer surface of the wind turbine blades, such as exterior with respect to an outer shell of the wind turbine blades. For instance, the blade connecting members may be connected to structures which are arranged outside, but connected to, the wind turbine blades, such as outside the shells of the blades.

In one aspect of the invention, the connection points of one the wind turbine blade are arranged adjacent each other, such as next to each other or even sharing some structural elements of the connection point. In a particular case, two blade connecting members (connected to different blades in the opposite end) are connected to the same connection point (7) at one blade. This has the advantage that when tension is applied in the blade connection members, then the blade is affected by one combined force and hence the blade will not be exposed to tension in two different directions by the blade connection members. Furthermore, when the connection points are adjacent to each other or the same connection point is used for both blade connecting members, it is possible to arrange the connection point(s) of both blade connection members closer to or even on the blade pitch axis.

By arranging the connecting points outside the wind turbine blades, the surface of the wind turbine blade can be maintained substantially intact. Furthermore, the wind turbine blades can perform pitching movements without affecting the blade connecting members, at least if the pitch axis is positioned carefully relative to the connecting points. The structure which connects the blade connecting members to the wind turbine blades may, e.g., be provided with a cover which improves the aerodynamic properties of the structure, e.g. in terms of increasing lift and/or reducing drag, in order to minimise the impact on the aerodynamic properties of the wind turbine blades.

The blade connecting members may be connected to the respective wind turbine blades via bearing structures mounted on or forming part of the wind turbine blades. The bearing structure may, e.g., be or include a roller bearing, a sliding bearing, a spherical bearing, or any other suitable kind of bearing.

The bearing structure ensures that the wind turbine blade is allowed to rotate relative to the blade connecting members, via the bearing structure. Thereby the wind turbine blades can perform pitching movements without affecting the blade connecting members, and thereby it is avoided that undesired loading, twist or tension is applied to the blade connecting members during pitching. When the blade connecting members are connected to the wind turbine blade via bearing structures, it is preferred that the pitch axis passing through the blade at the spanwise position of the blade connecting member. Particularly, it was found to be advantageous that the pitch axis passes through the shape formed by the bearing structure at this spanwise position.

In the case that the bearing structure is or comprises a spherical bearing, the blade connecting members are able to rotate freely relative to the wind turbine blades, about the connection point. Thereby only tension forces are transferred between the blade connecting members and the wind turbine blades, at the connection points.

In the case that the bearing structure protrudes from the wind turbine blade or is arranged circumferentially with respect to the wind turbine blade, the bearing structure may be provided with a fairing or a similar aerodynamic structure in order to improve the aerodynamical properties of the wind turbine blade in the region of the bearing structure.

The connection points on the wind turbine blades may preferably be arranged at a distance from the root end which is between 10% and 60% of the length of the wind turbine blades from the root end to the tip end, such as between 20% and 50% of the length of the wind turbine blades, such as between 25% and 40% of the length of the wind turbine blades, such as approximately 30% of the length of the wind turbine blades. In other cases, the connection points on the wind turbine blades may preferably be arranged at a distance from the root end which is between 25% and 60% of the length of the wind turbine blades from the root end to the tip end, such as between 35% and 55% of the length of the wind turbine blades, such as between 40% and 50% of the length of the wind turbine blades.

According to this embodiment, the connection points on the wind turbine blades are arranged at a position which is well clear of the root end as well as the tip end of the wind turbine blades.

The position of the connection points along the wind turbine blades may be selected in a manner which suitably balances various issues which need to be taken into consideration. For instance, positioning the connection point close to the tip end of the wind turbine blade results in very efficient support to the wind turbine blades by the blade connecting members. However, this comes at a price of a high drag caused by the blade connecting members during rotation of the rotor, and thereby decreased energy production. On the other hand, positioning the connection point close to the root end of the wind turbine blade results in a low drag caused by the blade connecting members, thereby minimising the adverse impact on the energy production of the wind turbine. However, the support to the wind turbine blades by the blade connecting members will not be very efficient. By positioning the connection points at a distance from the root end which is between 10% and 60% of the length of the wind turbine blade, these considerations are balanced in such a manner that efficient support is obtained without introducing an unacceptable drag. Furthermore, by positioning the connection points within this region it is ensured that the blade connecting members are attached to the wind turbine blades where a structural stiffness of the wind turbine blade is sufficiently high. For instance, the structural stiffness of the wind turbine blade decreases towards the tip end, and connecting the blade connecting members too near the tip end may therefore create a significant pre-deformation of the wind turbine blade, which may prevent the ability to pitch the blade.

The connection points on the wind turbine blades may be arranged at a position where a thickness-to-chord ratio of the wind turbine blade is between 20% and 50%, such as between 25% and 35% or 30% and 45% This is also a region of the wind turbine blade where a balance between efficient support and introduced drag, and with sufficient structural stiffness of the wind turbine blade, as described above.

The wind turbine blades may each comprise two separate parts, an inboard blade part comprising the root end and an outboard blade part comprising the tip end, the inboard blade part and the outboard blade part being connected to each other at a split position, and the connection points on the wind turbine blades may be arranged at the split positions.

According to this embodiment, each wind turbine blade is formed from two parts, i.e. the inboard blade part and the outboard blade part, which may be manufactured separately and subsequently joined to each other in order to form the wind turbine blade. This is sometimes referred to as 'split wind turbine blades'. This also allows the blade parts to be transported separately to the site of the wind turbine, and thereby even large wind turbine blades can be transported without introducing excessive transport costs.

When using such split wind turbine blades, it was found to be an advantage to arrange the connection points, i.e. the points where the blade connecting members are connected to the wind turbine blades, at the split position where the inboard blade part and the outboard blade part are connected to each other, because a suitable member attachment structure can be added to the wind turbine blade at this position without significantly degrading the strength of the wind turbine blade or the aerodynamic properties of the wind turbine blade. For instance, in the case that the blade connecting members are connected to the wind turbine blades via bearing structures, the bearing structures may advantageously form an interface between the inboard blade part and the outboard blade part.

The hub may comprise a hub member extending from the hub substantially along a direction defined by a rotational axis of the hub, and the pre-tension members may be connected to the hub member. The hub member may, e.g., extend in front of a rotor plane defined by the rotor of the wind turbine, i.e. towards the incoming wind in the case that the wind turbine is an upwind wind turbine.

According to this embodiment, the pre-tension members are not connected directly to the hub, but rather to a member forming a hub part, which extends from the hub along the direction defined by the rotational axis of the hub. Furthermore, the points of connection between the pre-tension members and the hub member may be positioned at a distance from the points where the wind turbine blades are connected to the hub, along the direction defined by the rotational axis of the hub. Thereby the pre-tension members are not only pulling the blade connecting members towards the hub, but also along the direction of the rotational axis of the hub, and thereby away from the tower. This also causes the wind turbine blades to be pulled in this direction, and this has a similar effect on the wind turbine blades as introducing a coning angle would have. This reduces edgewise and, in particular, flapwise loads at the blade roots, as well as secures tower clearance.

The hub member may be arranged to provide an adjustable pre-tension and/or adjustable stiffness in the pre-tension members and/or the blade connecting members via the pre-tension members. According to this embodiment, an adjustable pre-tension, as described above, is obtained by means of a mechanism which is connected to or forms part of the hub member. The adjusting mechanism may, e.g., be a hydraulic or another type of (linear) actuator, such as an electrical, pneumatic or mechanical (such as spring loaded) actuator. In this case the hub member may be provided with a hydraulic piston, e.g. movable along the direction defined by the rotational axis of the hub. Such a mechanism may, e.g., be used for adjusting the pre-tension in the blade connecting members in order to handle flapwise loads and/or control tower clearance during high thrust operation of the wind turbine.

It was found to be highly advantageous that the tension in each of the blade pre-tension members could be adjusted individually as this allows for improved balancing the tension in the blade connecting members. Furthermore, individual adjusting allowed for better control and reducing the risk of slack in the blade connecting member. This is preferably achieved by having an independent adjusting mechanism, such as hydraulic or another type of (linear) actuator such as electrically actuated pneumatically actuated, mechanically spring actuated or a combination of these, actuating on each pre-tension member individually. Surprisingly it was found that by use of individually adjusted pre-tension members, the actuators may also be able to act as vibration dampers of the blade connection members and pre-tension member by adjusting the effective stiffness of the pre-tension member. Furthermore, carefully controlled piston movement were able to reduce vibration in the blade connection members and/or the pre-tension members and thereby reduce the fatigue wear of the wind turbine generator components such as the blade connecting members, the pre-tension members and wind turbine blades, and/or reduce the acoustic emission from the wind turbine generator. The use of individually adjusted pre-tension members was therefore found to be highly advantageous.

The hub member may comprise adjusting mechanism comprising linear actuators arranged in a direction between the rotational axis of the hub and the connection point between the blade connecting member and the pre-tension member. This allows for an easy and efficient way to adjust the distance between the hub and the connection point between the blade connecting members individually and hence to adjust the tension in the corresponding pre-tension member. The linear actuator in this aspect of the invention is preferably a hydraulic linear actuator (like e.g. a hydraulic piston) or a pneumatic actuator as this allows for controlled movement under high tension and was found to also be able to act as a vibration damper of the blade connection members and/or pre-tension member by adjusting the effective stiffness of the pre-tension member and/or counteracting the vibration by piston movement. Hydraulic and pneumatic actuators were found to be particularly advantageous as they may change directly from a master mode (where it controls the length of the actuator piston) to a first slave mode (where it maintains the tension in the blade connecting cables or pre-tension cables in response to blade wind loads) and/or a second slave mode (where it dampens vibrations in blade connection cables or pre-tension cables) based on sensor input related to tension or vibration. Other types of linear actuators are also useful, such as for example electrical actuators, mechanical (such as spring type) actuators or combinations of these, such as a spring in combination with a hydraulic actuator.

As an alternative, the pre-tension members may be connected to a common point arranged inside the hub. The common point inside the hub may be 'floating' in the sense that it may move slightly in order to enable load sharing among the pre-tension members during operation of the wind turbine.

Furthermore, connecting the pre-tension members to a common point allows the pre-tension members to be tensioned from this common point. This has the advantage that only one position needs to be accessed in order to tension all of the pre-tension members for example by moving the common point forward/back along the rotational axis of the hub, or changing the ratio between the tension in all the pre-tension members by moving the common point in a direction away from the rotational axis of the hub. Such movement may for example be made using one or more hydraulic actuators.

Setting and/or adjusting the pre-tension of the pre-tension members and hence the blade connecting members may be conducted one time as part of the installation or commissioning of the wind turbine. However, it is preferred that the pre-tension is adjusted several times such as regularly, for example after measuring the pre-tension in at least one of the blade connecting members or at least one of the pre-tension members. The measuring may be part of a regular monitored program via at least one sensor arranged in the blades, the blade connecting members, the pre-tension members, and/or the adjusting mechanism. In one case, the pre-tension is adjusted with the orientation of the blade during the rotation of the rotor. In another case, the pre-tension is adjusted as a part of the pitching process, i.e. before, during and/or after pitching.

The wind turbine blades may define a coning angle within the interval 2° to 20°, such as within the interval 5° to 10°. In the present context the term 'coning angle' should be interpreted to mean an angle between a plane being substantially perpendicular to the direction defined by the rotational axis of the hub and a direction along which one of the wind turbine blades extends.

Accordingly, increasing the coning angle causes the tip ends of the wind turbine blades to be positioned further away from a plane orthogonal to the rotational axis of the hub and passing through the centre of the blade roots.

Introducing a coning angle enhances tower clearance and reduces flapwise loads at the root ends of the wind turbine blades.

The connection points on the wind turbine blades may be arranged at or near a pitch axis of the wind turbine blades. In the present context the term 'pitch axis' should be interpreted to mean an axis which the wind turbine blade rotates about when performing pitching movements. Connection points arranged "at or near" the pitch axis in the present context means that the distance from the connection points to the pitch axis is within a distance of the highest of a) 2% of the rotor diameter, and b) two blade chord length at the connection points, from the pitch axis when the blade is not loaded by the wind.

Thus, according to this embodiment, when the wind turbine blades rotate during pitching, the connection points are not moved, or are only moved to a very limited extent. Accordingly, the blade connecting members are also not moved, or only moved to a very limited extent. This minimises change in tension on the blade connecting members, and minimises forces applied at the connection points. Furthermore, this preserves full freedom in pitching.

As an alternative, the connection points on the wind turbine blades may be arranged in an offset position relative to the pitch axis. In this case, the blade connecting members will move during pitching. The wind turbine blades may, in this case, be interconnected in a manner which allows for collective pitching of the wind turbine blades, but only allows individual pitch to a limited extent.

The relative position of the pitch axis and the connection points may advantageously be selected in a manner which minimises pitch loads, i.e. the loads required for pitching the wind turbine blade, at various wind speeds. Particularly, it was found to be highly advantageous to arrange connecting points of the blade connecting members at or near the pitch axis of the blade as defined above.

The wind turbine blades may each be provided with at least one groove formed in an outer shell of the wind turbine blade, the at least one groove being arranged to receive part of a blade connecting member. The groove may advantageously be formed on the pressure side of the wind turbine blade.

According to this embodiment, the blade connecting members may be received in the respective grooves at some pitch angles and be arranged outside the respective grooves at other pitch angles. This allows the connection points to be arranged at or near the pitch axis, even though the extends inside the wind turbine blade, and the wind turbine blade can still perform pitching movements without colliding with the blade connecting members.

Each of the wind turbine blades may be curved in at least one direction between the root end and the tip end, thereby causing a pitch axis of the wind turbine blades to be located exterior with respect to the wind turbine blades, at least at the connection points. The wind turbine blades may be curved in a flapwise and/or in an edgewise direction. For instance, the curving of the wind turbine blades may be in the form of a sweep of the wind turbine blades. The curve may extend along the entire length of the wind turbine or only along a part of the length of the wind turbine blade. For instance, in the case that the wind turbine blade is split into an inboard blade part and an outboard blade part, then only one of the blade parts, e.g. the outboard blade part, may be curved. Alternatively or additionally, the curving may be introduces in the form of an angle between the inboard blade part and the outboard blade part.

According to this embodiment, the connection points may be arranged at or near the pitch axis, while still being positioned outside the wind turbine blade. This allows the wind turbine blade to perform pitching movements without colliding with the blade connecting members.

Each of the wind turbine blades may extend along a longitudinal direction, and the longitudinal direction may form a non-zero angle relative to a pitch axis of the pitch mechanism of the wind turbine blade. The non-zero angle may, e.g., be within the interval 0.1° to 10.0°, such as within the interval 0.5° to 3.0°. Since each wind turbine blade extends along a direction which forms a non-zero angle relative to the pitch axis, the pitch axis and the direction of the wind turbine blade are not coinciding. Accordingly, the wind turbine blades rotate about an axis which is not coinciding with their longitudinal axis during pitching movements.

According to this embodiment, the pitch axis may also be arranged exterior to the wind turbine blade at the positions of the connection points, due to the non-coinciding axes, similarly to the situation described above.

A non-zero angle between the pitch axis and the longitudinal direction of the wind turbine blade may, e.g., be obtained by introducing one or more wedges at the root end of the wind turbine blade, e.g. in the form of one or more shims. In this case the one or more shims may be connected to the hub and the wind turbine blade, and possibly to neighbouring shims, via separate bearings. Thereby the shim(s) is/are able to rotate independently, thereby changing the angle between the pitch axis and the longitudinal direction of the wind turbine blade. Furthermore, the bearings may be operated separately, e.g. performing collective pitch via one bearing and individual pitch via another bearing. This may decrease loads on the pitch mechanism, in particular on the bearings.

The pre-tension members and/or the blade connecting members may include a vibration damping mechanism.

According to this embodiment, vibrations in the pre-tension members and/or in the blade connecting members may be dampened during operation of the wind turbine, thereby reducing loads on the members as well as on the wind turbine blades. Furthermore, wire ropes may passively provide additional structural damping to the blade motion as individual fibres in wire ropes will interact with each other when stretched.

The vibration damping mechanism may be a passive vibration damping mechanism, such as an oil damper, flexible members, etc. In this case the vibration damping is provided automatically when the wind turbine operates. Alternatively, the vibration damping mechanism may be an active vibration damping mechanism, such as hydraulic cylinders or the like. In this case the vibration damping can be actively controlled.

The pre-tension members and/or the blade connecting members may be provided with aerodynamic devices. According to this embodiment, the adverse aerodynamic effects which are introduced by mounting members between the wind turbine blades are reduced by providing the members with aerodynamic devices, and thereby improving the aerodynamic properties of the members. The aerodynamic devices may, e.g., be of a kind which increases the lift and/or reduces the drag of the members. For instance, the aerodynamic devices may be in the form of airfoils or water drops.

The wind turbine may be an upwind wind turbine. In this case the rotor of the wind turbine faces the incoming wind, and thereby the flapwise loads on the wind turbine blades, originating from the wind, push the wind turbine blades towards the hub. The blade connecting members are very suitable for alleviating such flapwise loads.

As an alternative, the wind turbine may be a downwind wind turbine. In this case the rotor of the wind turbine is directed opposite to the incoming wind, and thereby the flapwise loads on the wind turbine blades, originating from the wind, push the wind turbine blades away from the hub.

BRIEF DESCRIPTION OF THE DRAWINGS

The invention will now be described in further detail with reference to the accompanying drawings in which.

DETAILED DESCRIPTION OF THE DRAWINGS

Figure 1:
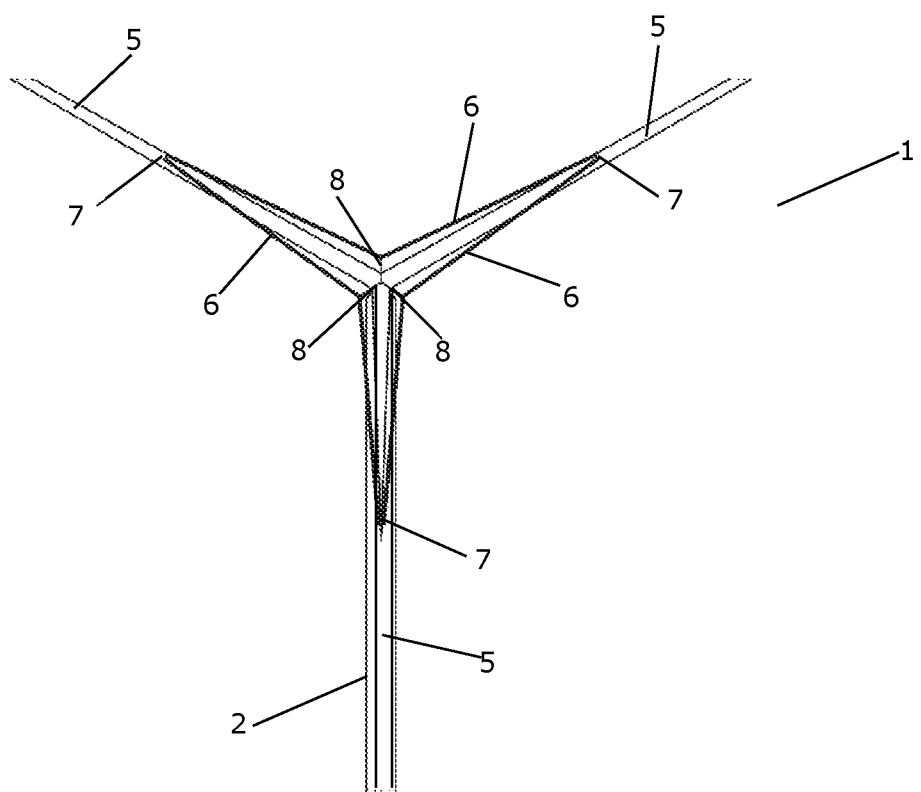
FIGS. 1 and 2 illustrate a wind turbine according to a first embodiment of the invention.
Figure 2:
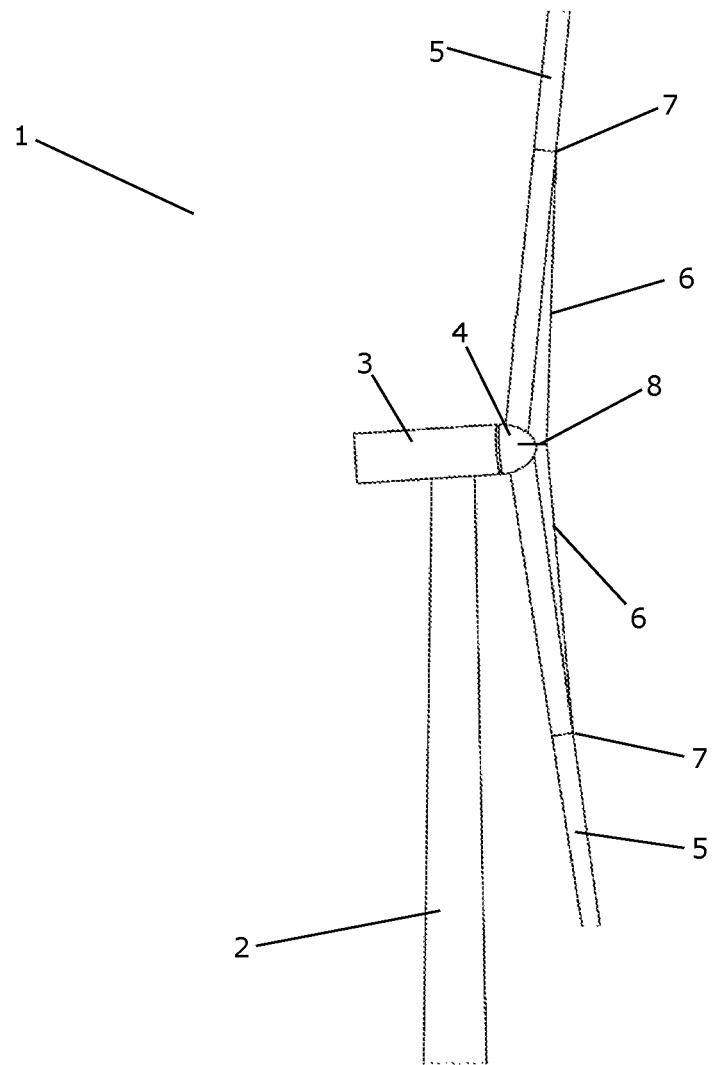

FIGS. 1 and 2 show a pitch controlled wind turbine 1 according to a first embodiment of the invention. FIG. 1 is a front view of the wind turbine 1, and FIG. 2 is a side view of the wind turbine 1.

The wind turbine 1 comprises a tower 2 and a nacelle 3 mounted on the tower 2. A hub 4 carrying three wind turbine blades 4 is mounted rotatably on the nacelle 3.

Three blade connecting members 6 interconnect neighbouring wind turbine blades 5 between connection points 7 on the wind turbine blades 5. Furthermore, the wind turbine 1 comprises three pre-tension members 8, each pre-tension member 8 extending between one of the blade connecting members 6 and the hub 4. Thereby the pre-tension members 8 provide pre-tension in the blade connecting members 6.

The pre-tensioned blade connecting members 6 cause the wind turbine blades 5 to mutually support each other, in the sense that loads on the wind turbine blades 5, in particular edgewise loads and flapwise loads, are 'shared' among the wind turbine blades 5.

Figure 3A:
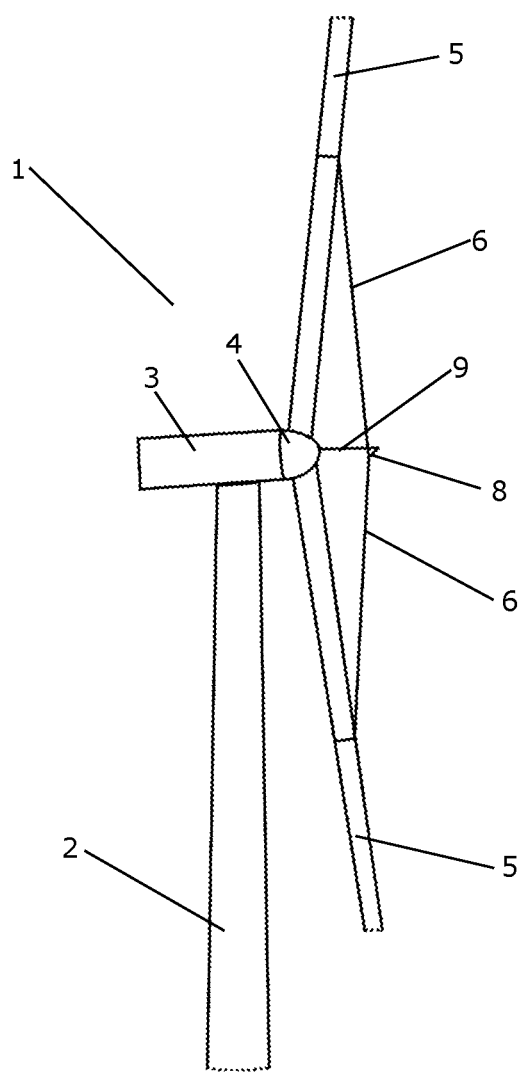
FIG. 3 is a side view of a wind turbine according to a second embodiment of the invention.
Figure 3B:
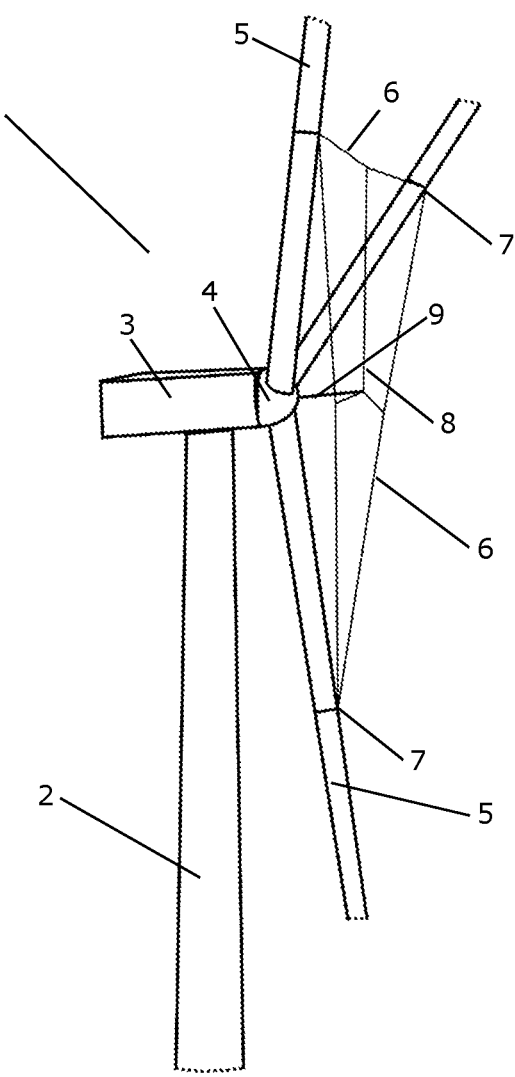

FIG. 3 is a side view of a pitch controlled wind turbine 1 according to a second embodiment of the invention. The wind turbine 1 of FIG. 3 is very similar to the wind turbine 1 of FIGS. 1 and 2, and it will therefore not be described in detail here. In FIG. 3 the blade connecting members are not visible.

In the embodiment of FIG. 3, the pre-tension members 8 are not connected directly to the hub 4. Instead, the pre-tension members 8 are connected to a hub part in the form of a hub member 9 which extends from the hub 4 substantially along a direction defined by a rotational axis of the hub 4. Thereby the connection point of the pre-tension members 8 is further away from the hub 4 than is the case in the embodiment of FIGS. 1 and 2, and thereby further away from the positions where the wind turbine blades 5 are connected to the hub 4. This has the consequence that the pre-tension members 8 are also pulling the blade connecting members (not shown) away from the hub 4 and away from the tower 2. This also causes the wind turbine blades 5 to be pulled in this direction, thereby further reducing edgewise and flapwise loads at the root of the wind turbine blades 5 and securing tower clearance, similar to what is obtained when a coning angle is introduced. Due to the use of connection members, this was found to tend to lead to increased stiffness in the inner part of the blade.

Figure 4:
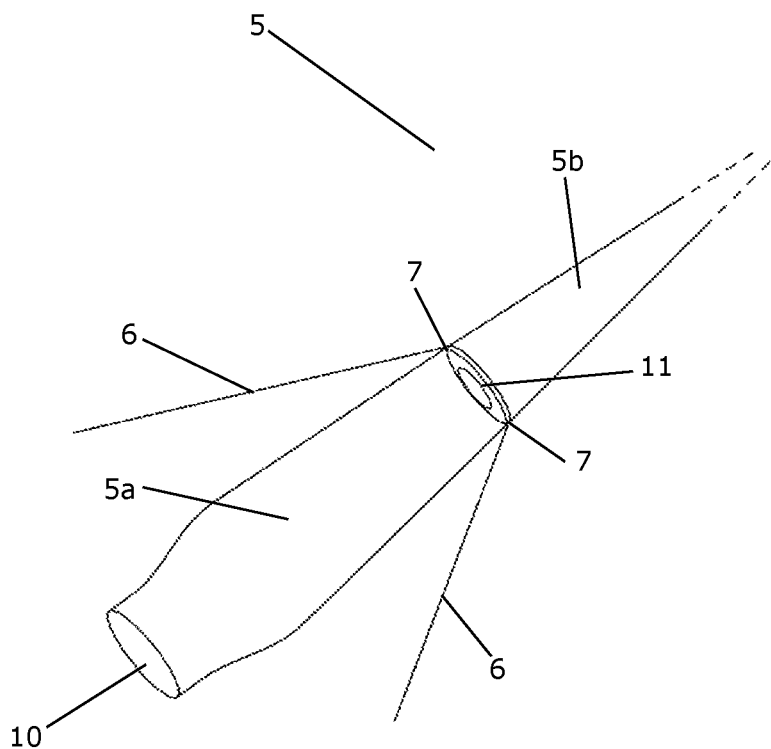
FIGS. 4-6 illustrate a wind turbine blade for a wind turbine according to an embodiment of the invention.
Figure 5:
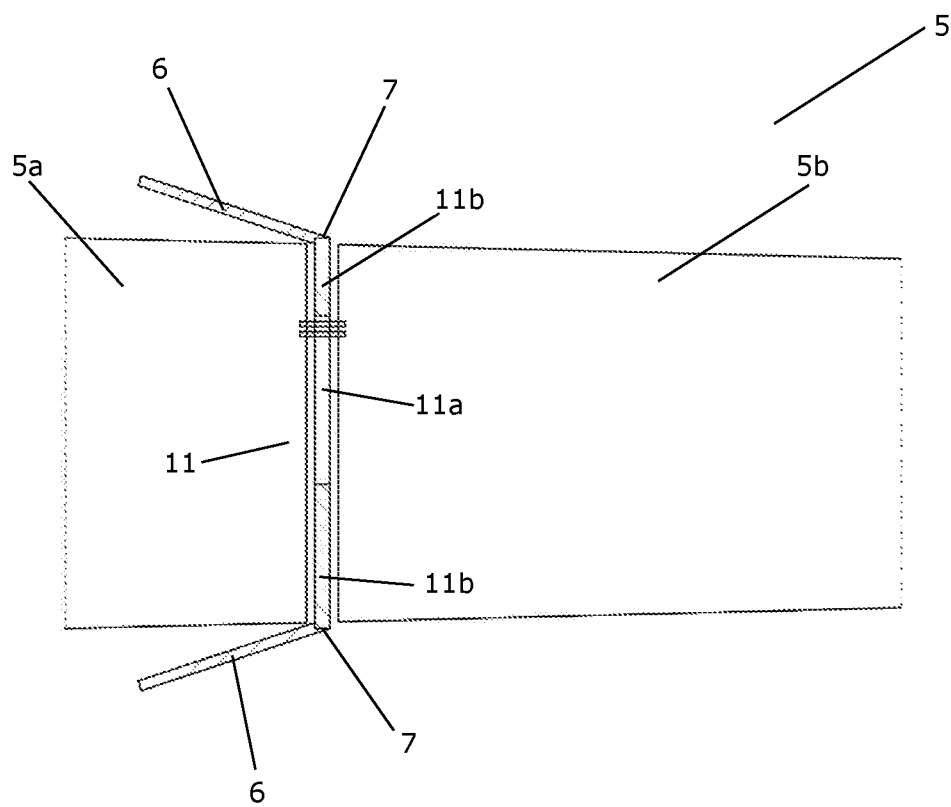
Figure 6:
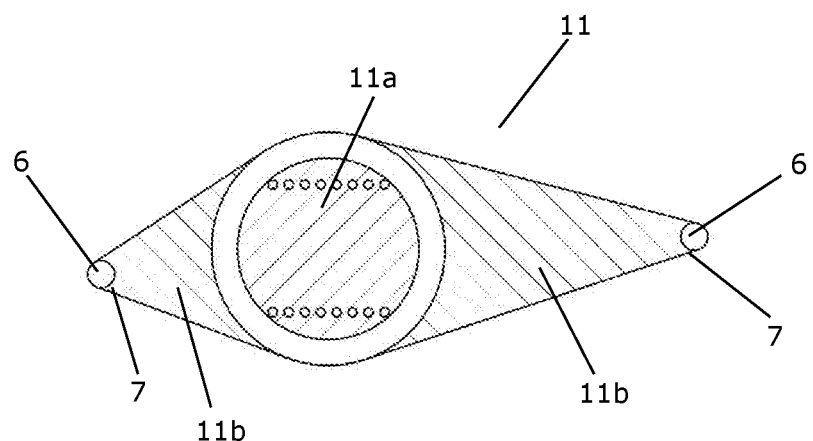

FIGS. 4-6 illustrate a wind turbine blade 5 for a wind turbine according to an embodiment of the invention. FIG. 4 is a perspective view of the wind turbine blade 5 and FIG. 5 is a cross sectional view along a longitudinal direction the wind turbine blade 5. FIG. 6 is a cross sectional view along a chordwise direction of the wind turbine blade 5.

The wind turbine blade 5 comprises a root end 10 adapted to be connected to a hub via a pitch mechanism, and a tip end (not shown), positioned opposite to the root end 10. The wind turbine blade 5 is formed from an inboard blade part comprising the root end 10 and an outboard blade part 5b comprising the tip end. The inboard blade part 5a and the outboard blade part 5b are connected to each other in order to form the wind turbine blade 5.

A bearing structure 11 is arranged at the position where the inboard blade part and the outboard blade part 5b are connected to each other. Two blade connecting members 6 are connected to the wind turbine blade 5 via connection points 7 on the bearing structure 11. Thereby, when the wind turbine blade 5 performs pitching movements, the blade connecting members 6 are not rotating along with the wind turbine blade 5. Thereby it is avoided that undesired twist or tension is applied to the blade connecting members 6 during pitching of the wind turbine blade 5.

In FIG. 5 it can be seen that the bearing structure 11 comprises a part 11a which is bolted to the blade parts 5a, 5b, and a part 11b which has the blade connecting members 6 connected thereto. The two parts 11a, 11b of the bearing structure 11 can rotate relative to each other.

FIG. 6 is a cross sectional view of the wind turbine blade 5 of FIG. 4, along a chordwise direction, and at the position of the bearing structure 11. Accordingly, FIG. 6 is essentially a side view of the bearing structure 11, and clearly shows the two parts 11a, 11b of the bearing structure 11.

Figure 7:
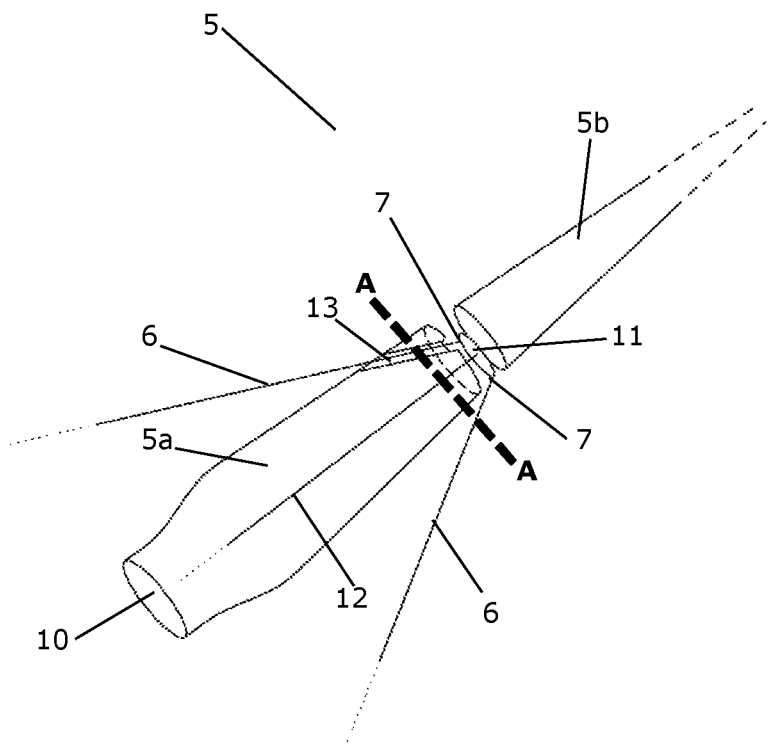
FIGS. 7-10 illustrate a wind turbine blade for a wind turbine according to an alternative embodiment of the invention.
Figure 8:
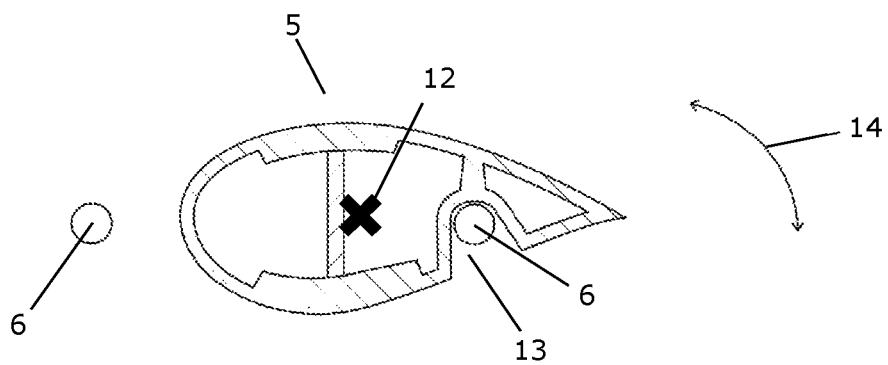
Figure 9:
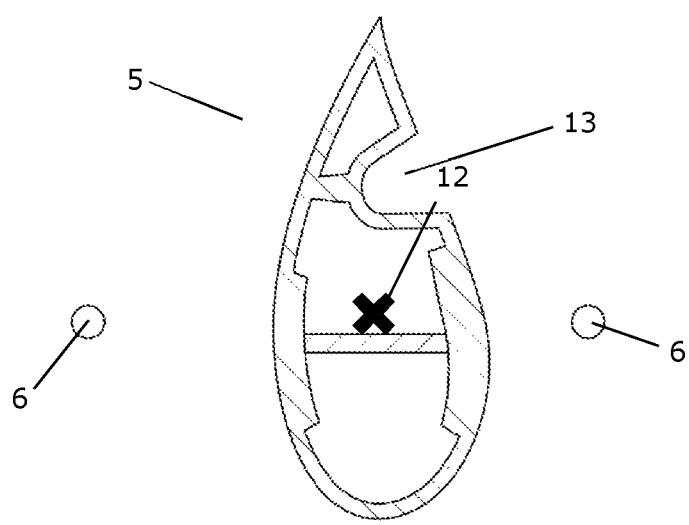
Figure 10:
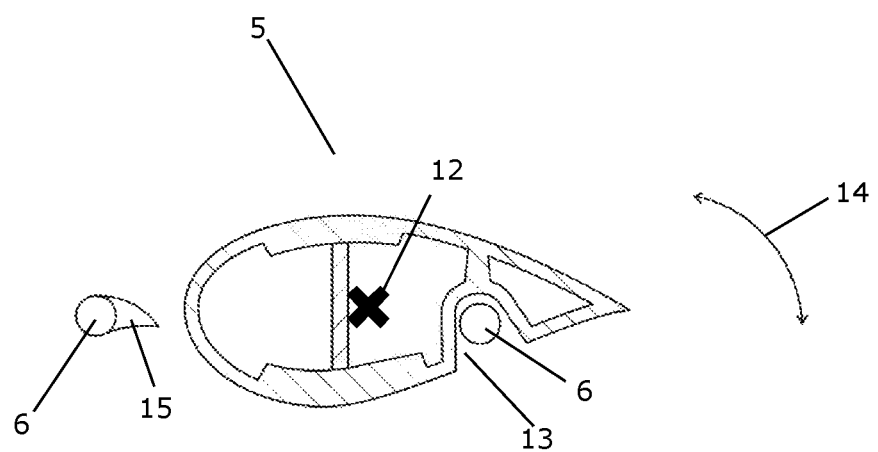

FIGS. 7-10 illustrate a wind turbine blade 5 for a wind turbine according to an alternative embodiment of the invention. FIG. 7 is a perspective view of the wind turbine blade 5, and FIGS. 8-10 are cross sectional views of the wind turbine blade 5 along a chordwise direction.

The wind turbine blade 5 of FIGS. 7-10 is very similar to the wind turbine blade 5 of FIGS. 4-6, and it will therefore not be described in detail here.

In the wind turbine blade 5 of FIGS. 7-10 the bearing structure 11 is arranged within an outer shell of the wind turbine blade 5. This can be seen in FIG. 7. Thereby the connection points 7 between the bearing structure 11 and the blade connecting members 6 are also arranged within the outer shell of the wind turbine blade 5, and closer to a pitch axis 12 of the wind turbine blade 5 than is the case in the embodiment illustrated in FIGS. 4-6. This minimises loads on the blade connecting members 6, and minimises forces applied at the connection points 7.

In order to avoid that the wind turbine blade 5 collides with the blade connecting members 6 during pitching, the wind turbine blade 5 is provided with a groove 13 formed in the pressure side of the wind turbine blade 5. The groove 13 is arranged to receive a part of a blade connecting member 6. In FIG. 7, one of the blade connecting members 6 is received in the groove 13.

FIG. 8 is a cross sectional view of the wind turbine blade 5 of FIG. 7 along a chordwise direction. The wind turbine blade 5 is at a pitch angle where one of the blade connecting members 6 is received in the groove 13. Pitching movements are indicated by arrow 14.

In FIG. 9, the wind turbine blade 5 has been moved to a pitch angle where the blade connecting member 6 is no longer received in the groove 13.

FIG. 10 illustrates a similar embodiment in the form of a cross sectional view of a wind turbine blade 5 along a chordwise direction. The wind turbine blade 5 is at a pitch angle where one of the blade connecting members 6 is received in the groove 13. In the embodiment of FIG. 10 two of the blade connecting members 6 have been provided with aerodynamic devices in the form of airfoils 15. This improves the aerodynamic properties of the blade connecting members 6, thereby minimising the adverse effects on the efficiency of the wind turbine which are introduced by providing the wind turbine with blade connecting members 6.

Figure 11:
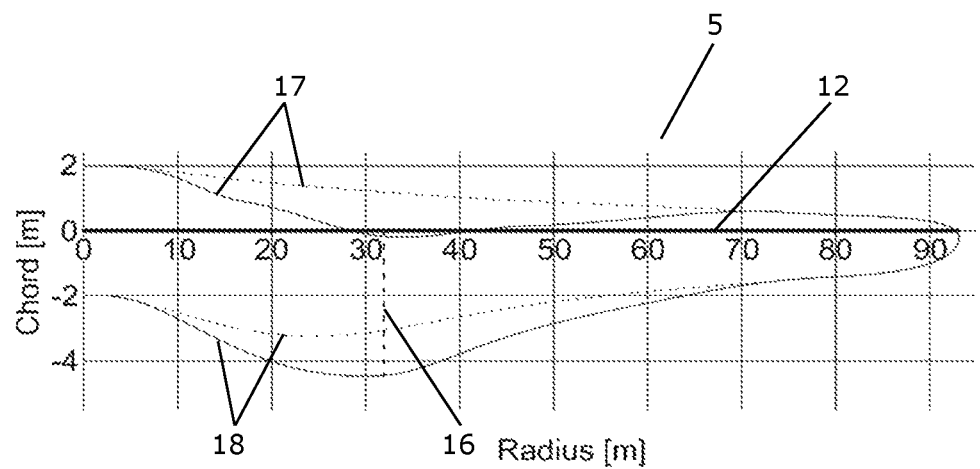
FIGS. 11 and 12 illustrate a curved wind turbine blade for a wind turbine according to an embodiment of the invention.
Figure 12:
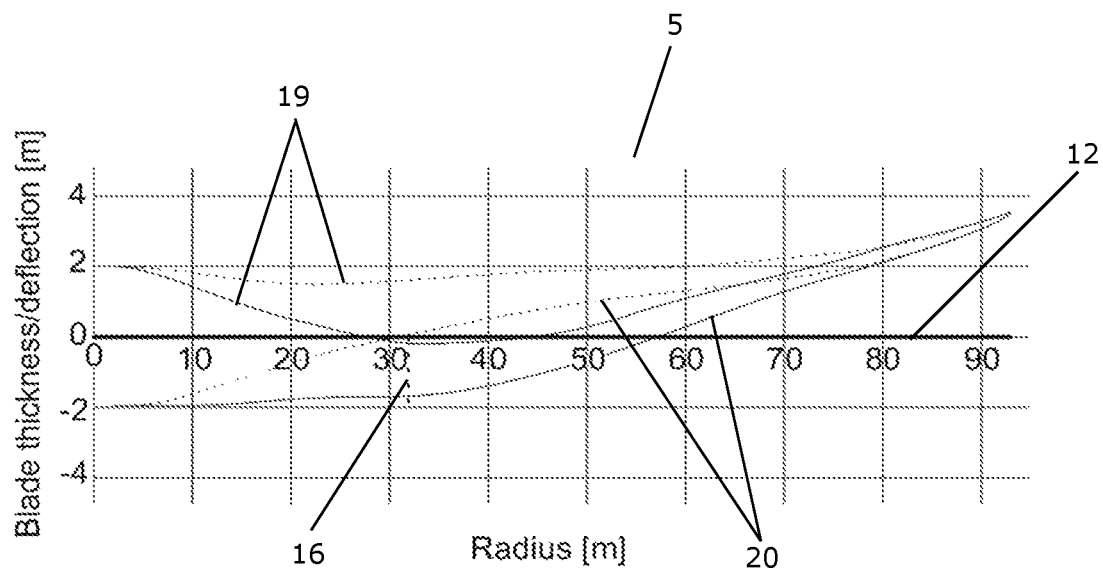

FIGS. 11 and 12 illustrate a curved wind turbine blade 5 for a wind turbine according to an embodiment of the invention. FIG. 11 shows the wind turbine blade 5 along the chord direction, and FIG. 12 shows the wind turbine blade 5 along a direction perpendicular thereto.

The dotted line in FIGS. 11 and 12 represents an example prior art wind turbine blade, and the solid line represents a wind turbine blade 5 for use in a wind turbine according to an embodiment of the invention. The dashed line 16 marks a position where the wind turbine blade 5 is split into an inboard part and an outboard part.

FIG. 11 shows a leading edge 17 and a trailing edge 18 for each of the represented wind turbine blades 5. It can be seen that the wind turbine blade 5 according to the invention is curved relative to the prior art wind turbine blade in such a manner that a pitch axis 12 of the wind turbine blade 5 according to the invention is positioned outside the wind turbine blade 5, at the leading edge 17 side, and at the split position 16.

FIG. 12 shows a pressure side 19 and a suction side 20 for each of the represented wind turbine blades 5. Also along this direction, the wind turbine blade 5 according to the invention is curved relative to the prior art wind turbine blade 5, in such a manner that the pitch axis 12 of the wind turbine blade 5 according to the invention is positioned outside the wind turbine blade 5, at the pressure side 19, and at the split position 16.

Thus, the wind turbine blade 5 for use in a wind turbine according to an embodiment of the invention is curved along two directions, and it has a shape which cause the pitch axis 12 of the wind turbine blade 5 to be arranged outside the leading edge 17 and outside the pressure side 19 of the wind turbine blade at the split position 16. Accordingly, if the blade connecting members are connected to the wind turbine blade 5 at the split position 16, the connection points can be positioned at or near the pitch axis 12, but outside the wind turbine blade 5. Thereby the blade connecting members can be connected to the wind turbine blade 5 in an easy manner, while reducing the loads on the blade connecting members and the connection points during pitching of the wind turbine blade 5.

It is noted that the wind turbine blades 5 of FIGS. 11 and 12 are not drawn to scale, in order to emphasize the modified shape of the wind turbine blade 5 according to the invention.

Figure 13:
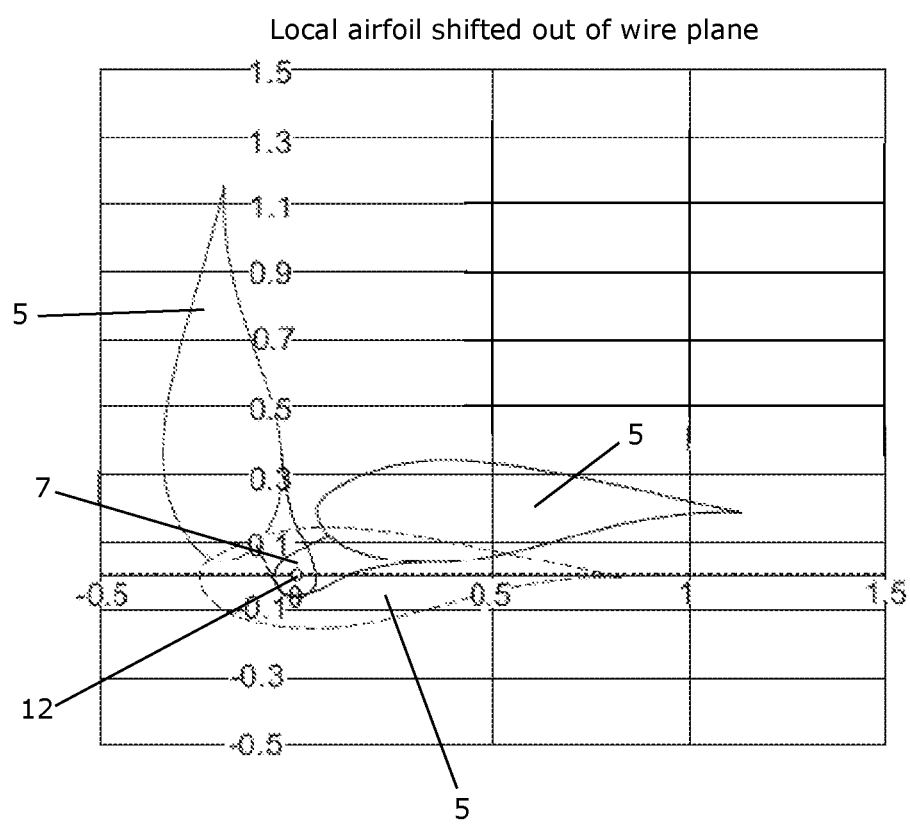
FIG. 13 illustrates pitching of a wind turbine blade with a pitch axis arranged exterior with respect to the wind turbine blade.

FIG. 13 illustrates pitching of a wind turbine blade 5 with a pitch axis 12 arranged exterior with respect to the wind turbine blade 5. The dashed line represents a prior art wind turbine blade 5, and the solid line represents a wind turbine blade 5 for use in a wind turbine according to an embodiment of the invention, at two extreme pitch angles.

Blade connecting members are connected to the wind turbine blade 5 according to the invention at a connection point 7 which is arranged outside the wind turbine blade 5 and at or near the pitch axis 12. It can be seen from FIG. 13 that this allows the wind turbine blade 5 to perform pitching movements without affecting the blade connecting members.

Figure 14:
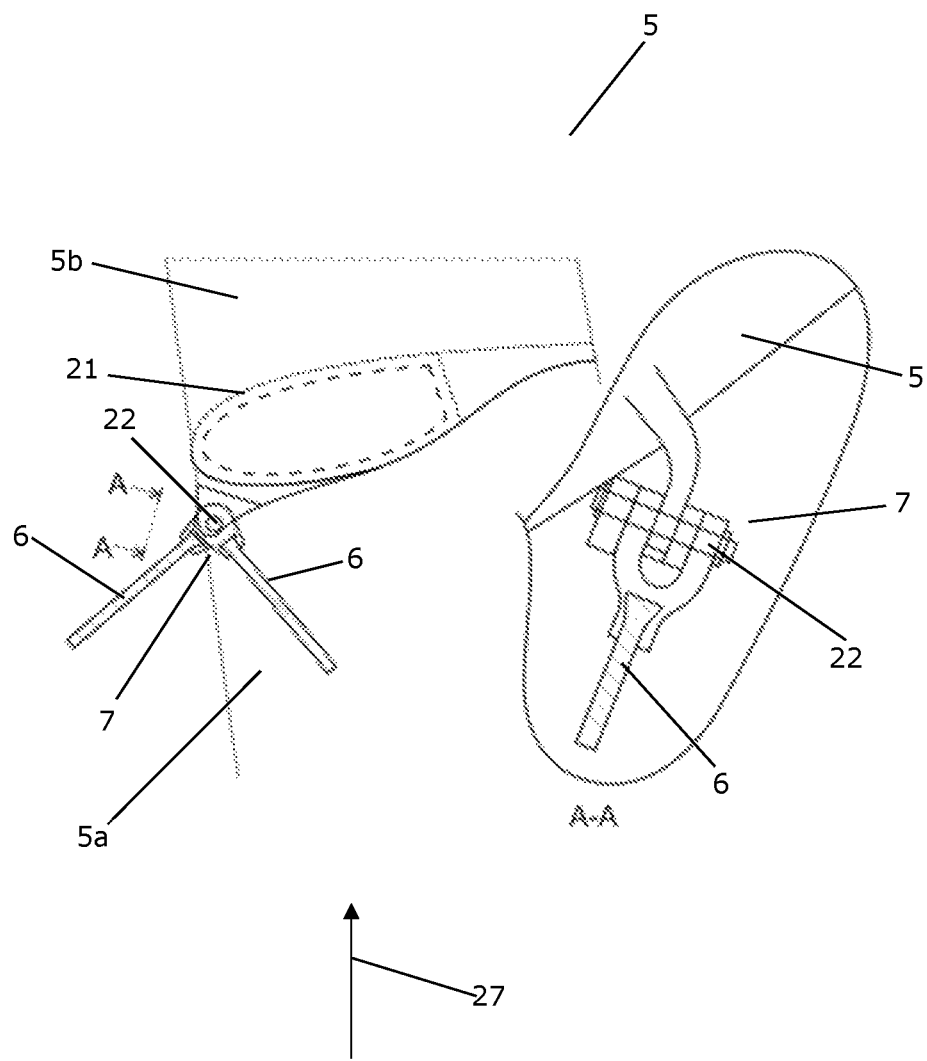
FIGS. 14 and 15 illustrate attachment of a blade connecting member to a wind turbine blade in accordance with two embodiments of the invention.

FIG. 14 illustrates a wind turbine blade 5 for use in a wind turbine according to an embodiment of the invention. The wind turbine blade 5 comprises an inboard blade part 5a and an outboard blade part 5b connected to each other via a casted structure 21. Blade connecting members 6 are connected to the casted structure 21 via a hinge 22, the hinge 22 thereby forming a connection point 7 between the blade connecting members 6 and the wind turbine blade 5. A wind direction is indicated by arrow 27.

Since the blade connecting members 6 are connected to the wind turbine blade via the hinge 22, the blade connecting members 6 are allowed to move relative to the wind turbine blade 5. This may, e.g., be relevant during pitching of the wind turbine blade 5.

Figure 15:
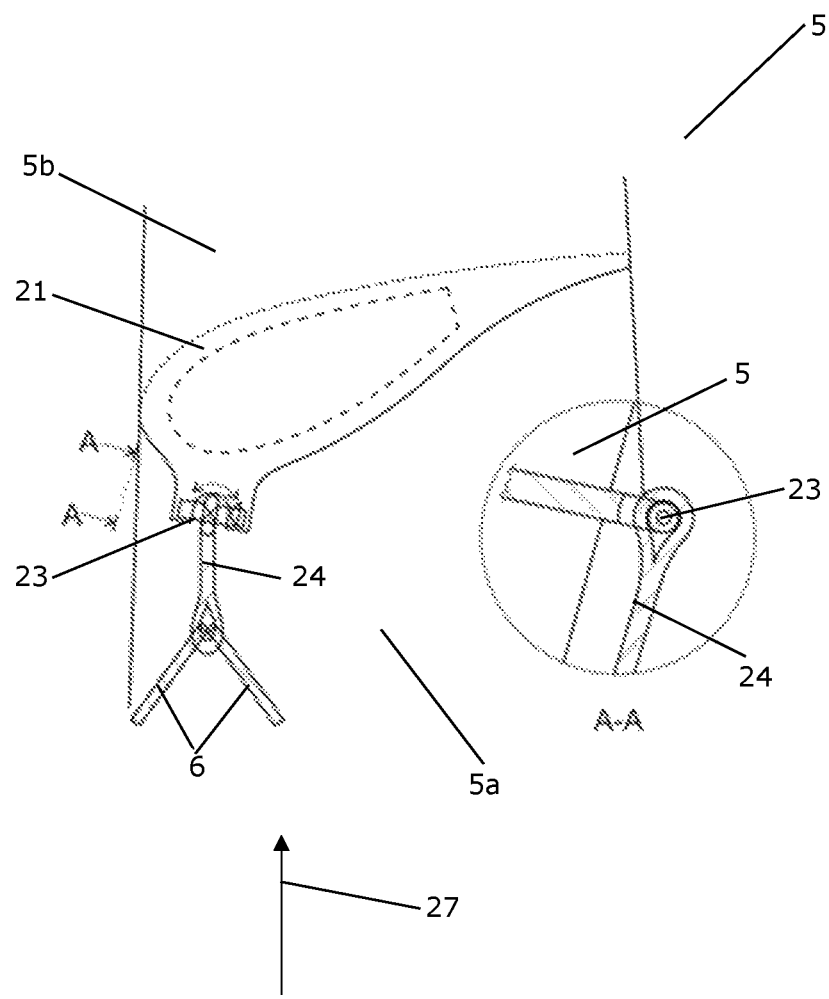

FIG. 15 illustrates a wind turbine blade 5 for use in a wind turbine according to an alternative embodiment of the invention. Similarly to the embodiment of FIG. 14, the wind turbine blade 5 comprises an inboard blade part 5a and an outboard blade part 5b connected to each other via a casted structure 21. In the embodiment of FIG. 15 the blade connecting members 6 are connected to the casted structure 21 via a spherical bearing 23 and a flexible cable 24. The spherical bearing 23 allows the blade connecting members 6 to move freely relative to the wind turbine blade 5. The flexible cable 24 provides damping to the blade connecting members 6. A wind direction is indicated by arrow 27.

Figure 16:
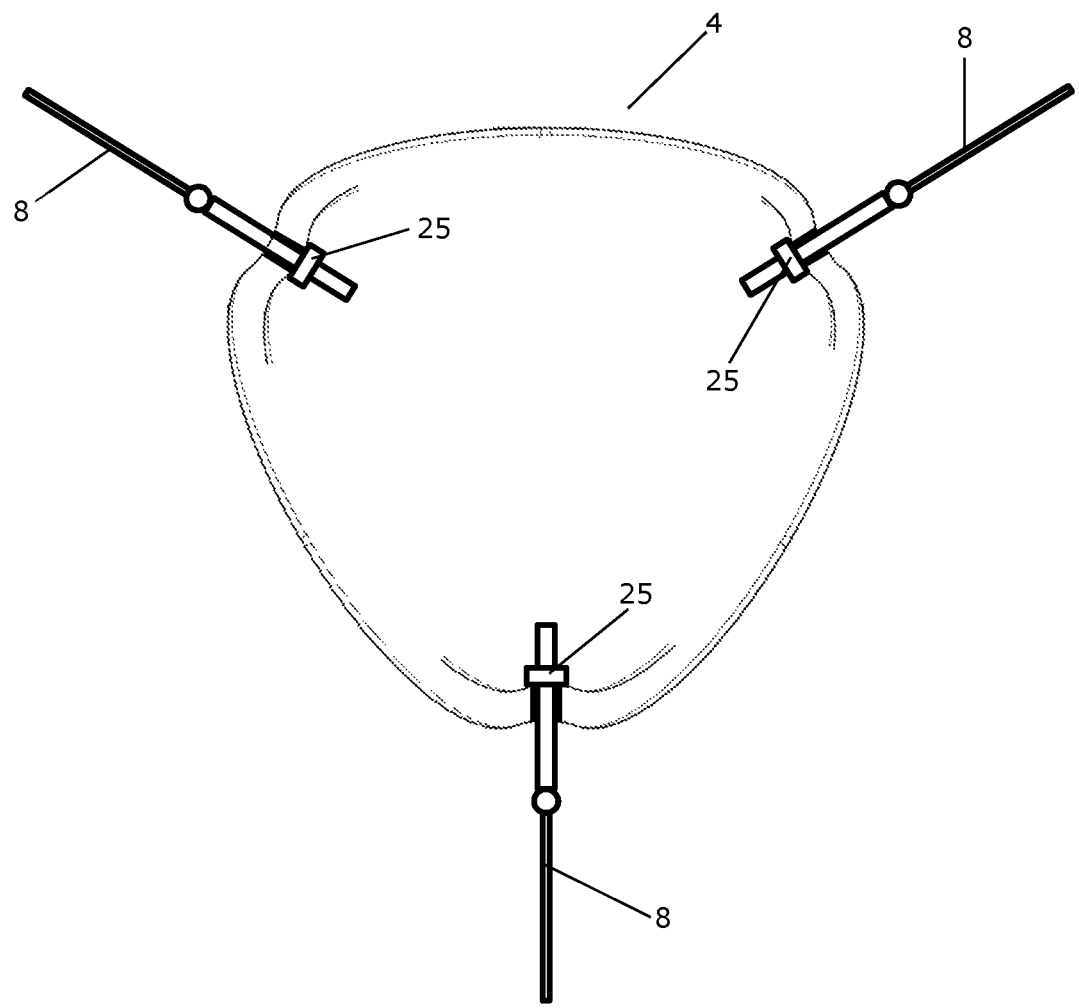
FIGS. 16 and 17 illustrate attachment of pre-tension members to a hub in accordance with two embodiments of the invention.

FIG. 16 is a cross sectional view of a hub 4 for a wind turbine according to an embodiment of the invention. Three pre-tension members 8 are connected to the hub 4. The pre-tension provided by the pre-tension members 8 can be adjusted individually by means of adjustment mechanisms 25 arranged inside the hub 4. Thereby the pre-tension of all three pre-tension members 8 can be adjusted from within the hub 4. Thereby the individual adjustment of the pre-tension of the pre-tension members 8 can easily be coordinated and performed substantially simultaneously in order to avoid uneven forces on the wind turbine blades due to large differences in pre-tension of the pre-tension members 8.

Figure 17:
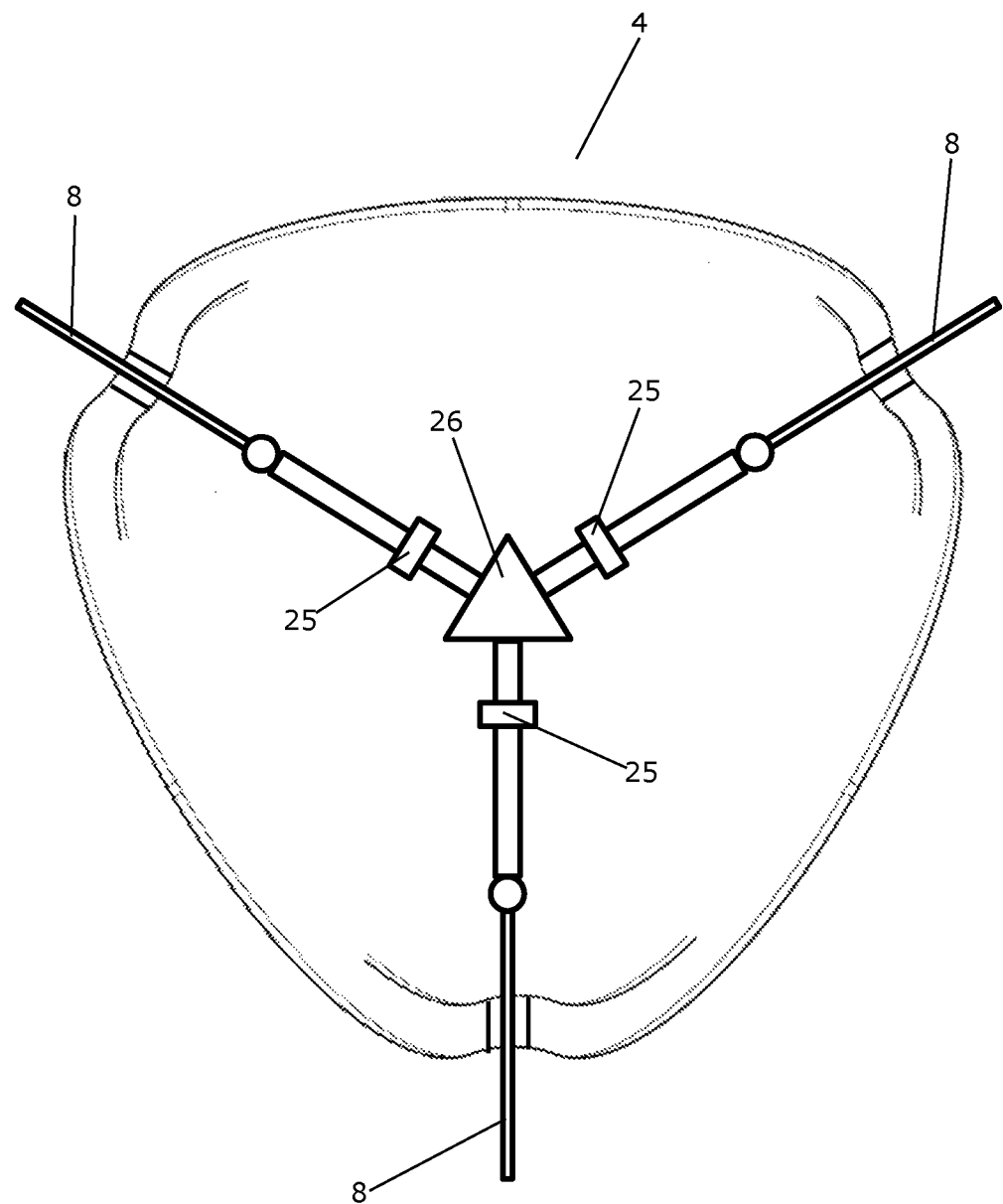

FIG. 17 is a cross sectional view of a hub 4 for a wind turbine according to an alternative embodiment of the invention. The hub 4 of FIG. 17 also has three pre-tension members 8 connected thereto, and the pre-tension provided by the pre-tension members 8 can be adjusted individually by means of adjustment mechanisms 25. However, in the hub 4 of FIG. 17, the pre-tension members 8 are connected to a common anchoring part 26 arranged inside the hub 4. The anchoring part 26 is floating in the sense that it is allowed to move inside the hub 4 to a certain extent. Thereby load sharing and balancing among the pre-tension members 8 during operation of the wind turbine is obtained.

Figure 18:
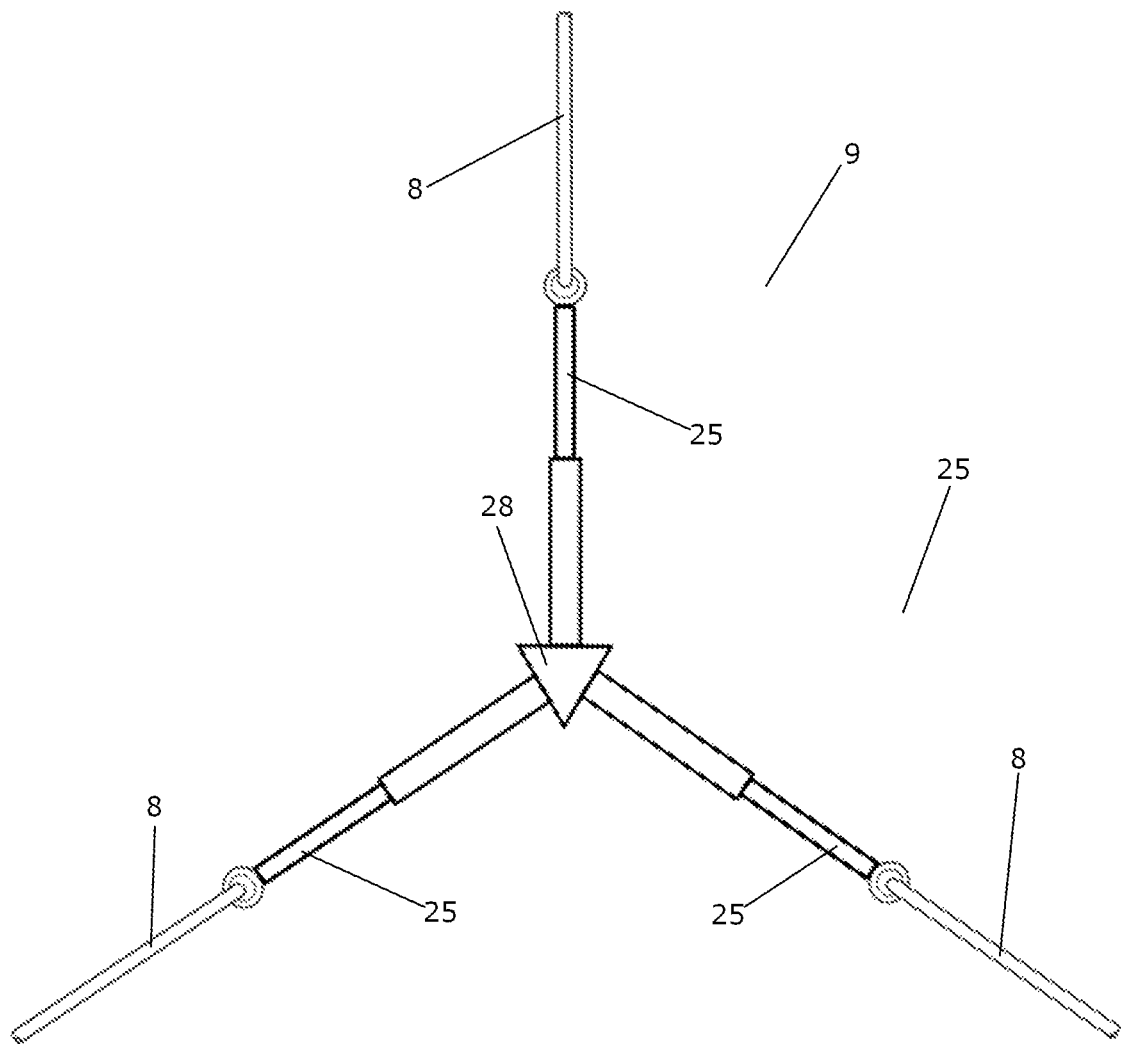
FIG. 18 illustrates a hub member with individually tension adjusting mechanisms.

FIG. 18 is a view of a hub member 9 with individually tension adjusting mechanisms 25 actuating on each of the pre-tension members 8. The adjusting mechanisms 25 form part of the hub member 9 and are arranged in a direction between the rotational axis of the hub (28) and the connection point between the blade connecting member (6) and the pre-tension member (7). Typically, the adjusting mechanisms are arranged on an element extending along the rotation axis of the rotor, such as a tripod or a beam to provide a stable fixation point for the adjusting mechanisms. The adjusting mechanisms preferably comprises linear actuators, such as hydraulic, electrical, pneumatic, mechanical or a thereof. The hub member 9 may extend beyond the nose cone. It is preferred that the hub member 9 extends so far beyond the nose cone that the direction of the pre-tension members intercept with the rotational axis 28 upwind of a plane defined by the blade connection points 7 as this enhance stiffness of the rotor.

The invention claimed is:

1. A pitch controlled wind turbine comprising a tower, a nacelle mounted on the tower, a hub mounted rotatably on the nacelle, and at least three wind turbine blades, wherein each wind turbine blade extends between a root end connected to the hub via a pitch mechanism, and a tip end, the wind turbine further comprising at least three blade connecting members, each blade connecting member extending between a connection point on one wind turbine blade and a connection point on a neighbouring wind turbine blade, where the connection point on a given wind turbine blade is arranged at a distance from the root end and at a distance from the tip end of the wind turbine blade, wherein the wind turbine further comprises at least three pre-tension members, each pre-tension member being connected to one of the blade connecting members and to a hub part, each pre-tension member thereby providing pre-tension in the blade connecting member to which it is connected, and wherein the pre-tension members are tensioned and arranged to provide an adjustable pre-tension in the blade connecting members.

2. The pitch controlled wind turbine according to claim 1, wherein the connection points are arranged outside an outer surface of the wind turbine blades.

3. The pitch controlled wind turbine according to claim 1, wherein the blade connecting members are connected to the respective wind turbine blades via bearing structures mounted on or forming part of the wind turbine blades.

4. The pitch controlled wind turbine according to claim 1, wherein the connection points on the wind turbine blades are arranged at a distance from the root end which is between 10% and 60% of the length of the wind turbine blades from the root end to the tip end.

5. The pitch controlled wind turbine according to claim 1, wherein the connection points on the wind turbine blades are arranged at a position where a thickness-to-chord ratio of the wind turbine blades is between 20% and 50%.

6. The pitch controlled wind turbine according to claim 1, wherein the wind turbine blades each comprise an inboard blade part comprising the root end and an outboard blade part comprising the tip end, the inboard blade part and the outboard blade part being connected to each other at a split position, and wherein the connection points on the wind turbine blades are arranged at the split positions.

7. The pitch controlled wind turbine according to claim 1, wherein the hub comprises a hub member extending from the hub substantially along a direction defined by a rotational axis of the hub, and wherein the pre-tension members are connected to the hub member.

8. The pitch controlled wind turbine according to claim 7, wherein the hub member is arranged to provide at least one of an adjustable pre-tension and adjustable stiffness in the pre-tension members or blade connecting members via the pre-tension members.

9. The pitch controlled wind turbine according to claim 1, wherein the pre-tension members are connected to a common point arranged inside the hub.

10. The pitch controlled wind turbine according to claim 1, wherein the wind turbine blades define a coning angle within the interval 2° to 20°.

11. The pitch controlled wind turbine according to claim 1, wherein the connection points on the wind turbine blades are arranged at or near a pitch axis of the wind turbine blades.

12. The pitch controlled wind turbine according to claim 1, wherein the wind turbine blades are each provided with at least one groove formed in an outer shell of the wind turbine blade, the at least one groove being arranged to receive part of a blade connecting member.

13. The pitch controlled wind turbine according to claim 1, wherein each of the wind turbine blades is curved in at least one direction between the root end and the tip end, thereby causing a pitch axis of the wind turbine blades to be located exterior with respect to the wind turbine blades, at least at the connection points.

14. The pitch controlled wind turbine according to claim 1, wherein each of the wind turbine blades extends along a longitudinal direction, and wherein the longitudinal direction forms a non-zero angle relative to a pitch axis of the pitch mechanism of the wind turbine blade.

15. The pitch controlled wind turbine according to claim 1, wherein at least one of the pre-tension members or the blade connecting members include a vibration damping mechanism.

16. The pitch controlled wind turbine according to claim 1, wherein at least one of the pre-tension members or the blade connecting members are provided with aerodynamic devices.

17. The pitch controlled wind turbine according to claim 1, wherein the wind turbine is an upwind wind turbine.

18. The pitch controlled wind turbine according to claim 1, wherein at least one of the connection points of one the wind turbine blade are arranged adjacent each other or two blade connecting members are connected to the same connection point.

19. The pitch controlled wind turbine according to claim 1, wherein a tension in the pre-tension members is individually adjustable.

20. The pitch controlled wind turbine according to claim 8, where the hub member comprises an adjusting mechanism having a linear actuator arranged in a direction between the rotational axis of the hub and the connection point between the blade connecting member and the pre-tension member.

* * * * *